H. SCOVELL & J. C. BANKER.
Improvement in Bee-Hives.
No. 131,632.  Patented Sep. 24, 1872.
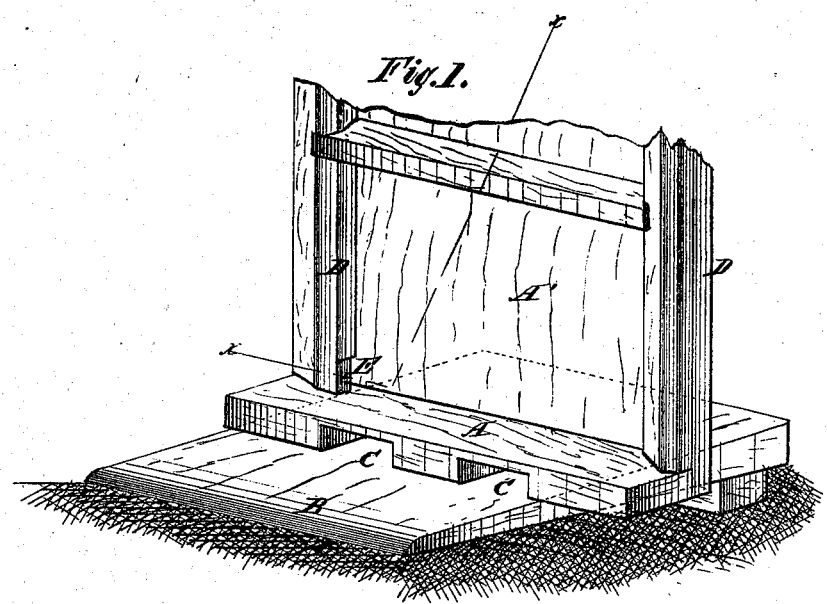
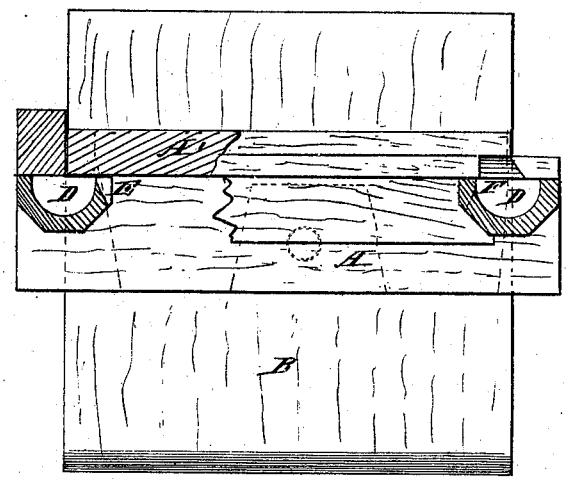

UNITED STATES PATENT OFFICE.

HARRIS SCOVELL AND JOHN C. BANKER, OF WASECA, MINNESOTA.

IMPROVEMENT IN BEE-HIVES.

Specification forming part of Letters Patent No. 131,632, dated September 24, 1872.

*To all whom it may concern:*

Be it known that we, HARRIS SCOVELL and JOHN C. BANKER, of Waseca, in the county of Waseca and State of Minnesota, have invented a new and useful Improvement in Bee-Hive Attachment, of which the following is a specification:

This invention consists in a device for misleading the robber-bees and the bee-millers from the hive, as will be hereinafter described.

In the accompanying drawing, Figure 1 is a sectional view, showing the bee-entrance; also the trap device for misleading the enemies of the bees in the hive. Fig. 2 is a section of Fig. 1 taken on the line $x\,x$; also showing the top of one of the hollow columns.

Similar letters of reference indicate corresponding parts.

A is a transverse board at the base of the front A′, which rests upon the bottom B of the hive, having two (more or less) grooves, C, therein, which form the general bee-entrance to the hive. The bees belonging to the hive will seek this entrance to the honey-apartment. There is an idle and vagrant class of bees, as well as of men, who are disposed to prey upon the industry of others, and who plunder the hoarded treasures of the more thrifty occupants of the hive. There is also the destructive miller, which is constantly seeking an entrance to the hive. Now, the robber-bee and the "bee-miller" being strangers to the hive will light upon the side or front of the hive and will crawl about to find an entrance. We accommodate them in this matter, and provide one or more entrances, which leads them astray and into a chamber in the top of the hive, which contains no honey, and where the industrious bees do not go. D D represent hollow columns. At the base of one or both an orifice or entrance hole is made, one of which is seen in the drawing, marked E, and at the top of the column is an orifice, F, for their egress into a vacant chamber in the top of the hive. In crawling on the front of the hive (or on this attachment to the hive) the robber-bee or miller will find one of these entrances, by which they will be led to the top of the hive into the vacant chamber before mentioned. The fronts of bee-hives may be constructed in this manner if desired, but we design this trap for ridding the bee-hive of these pests as an attachment to old hives. Whether the hive is made in this manner or the trap is attached, the result is the same—the strange bees and millers are deceived and led away on a wrong path, and they do not retrace their steps.

Having thus described our invention, we claim as new and desire to secure by Letters Patent—

The transverse piece A, front A′, hollow columns (one or more) D D, orifices E and F, substantially as and for the purposes described.

HARRIS SCOVELL.
JOHN C. BANKER.

Witnesses:
H. P. NORTON,
J. F. PRESTON.